(12) United States Patent
Karabinis

(10) Patent No.: US 12,556,924 B2
(45) Date of Patent: Feb. 17, 2026

(54) SELECTIVELY ACCESSING INFORMATION THAT IS STORED IN A DEVICE RESPONSIVE TO AN AUTHORITY OF A REQUESTING DEVICE

(71) Applicant: ENK Wireless, Inc., Cary, NC (US)

(72) Inventor: Dimitrios P. Karabinis, Edmonds, WA (US)

(*) Notice: Subject to any disclaimer, the term of this patent is extended or adjusted under 35 U.S.C. 154(b) by 133 days.

(21) Appl. No.: 18/440,648

(22) Filed: Feb. 13, 2024

(65) Prior Publication Data

US 2024/0187859 A1 Jun. 6, 2024

Related U.S. Application Data

(63) Continuation-in-part of application No. 18/165,057, filed on Feb. 6, 2023, now abandoned.

(60) Provisional application No. 63/269,315, filed on Mar. 14, 2022, provisional application No. 63/268,295, filed on Feb. 21, 2022.

(51) Int. Cl.
G06F 7/04 (2006.01)
G06F 15/16 (2006.01)
H04L 29/06 (2006.01)
H04W 12/03 (2021.01)
H04W 12/08 (2021.01)
H04W 12/30 (2021.01)

(52) U.S. Cl.
CPC ........... *H04W 12/08* (2013.01); *H04W 12/03* (2021.01); *H04W 12/30* (2021.01)

(58) Field of Classification Search
CPC ...... H04W 12/08; H04W 12/03; H04W 12/30
USPC .......................................................... 726/4
See application file for complete search history.

(56) References Cited

U.S. PATENT DOCUMENTS

| | | | |
|---|---|---|---|
| 8,646,060 B1 | 2/2014 | Ben Ayed | |
| 8,751,535 B1* | 6/2014 | Kim | G06F 21/6245 715/713 |
| 11,501,370 B1* | 11/2022 | Paya | H04L 9/0819 |
| 2004/0078248 A1 | 4/2004 | Altschuler | |
| 2006/0145893 A1 | 7/2006 | Hassett | |
| 2006/0165060 A1 | 7/2006 | Dua | |
| 2007/0197261 A1 | 8/2007 | Humbel | |
| 2007/0250393 A1 | 10/2007 | Alberth et al. | |

(Continued)

FOREIGN PATENT DOCUMENTS

WO 2007109574 A2 9/2007

OTHER PUBLICATIONS

United States Patent and Trademark Office, "Restriction Requirement", U.S. Appl. No. 18/165,057, Mar. 27, 2024, 5 pgs.

(Continued)

*Primary Examiner* — Jeffrey C Pwu
*Assistant Examiner* — Samuel Ambaye
(74) *Attorney, Agent, or Firm* — Carlson, Caspers, Vandenburgh & Lindquist, P.A.

(57) ABSTRACT

A method/system is provided comprising the steps/functions of: associating a first device with a person; storing information in the first device; and responsive to an authority associated with a second device, and responsive to receiving a request at the first device from the second device, selectively accessing a specific component of the information that is stored in the first device, comprising only a subset of the information that is stored in the first device, via the second device and a wireless link that is established between the first device and the second device.

35 Claims, 7 Drawing Sheets

(56) References Cited

U.S. PATENT DOCUMENTS

| | | |
|---|---|---|
| 2011/0314539 A1 | 12/2011 | Horton |
| 2016/0112445 A1 | 4/2016 | Abramowitz |
| 2017/0325097 A1* | 11/2017 | Chen .................... H04W 16/14 |
| 2021/0393478 A1* | 12/2021 | Bhatti ................ A61H 23/0263 |

OTHER PUBLICATIONS

United States Patent and Trademark Office, "Non-Final Office Action", U.S. Appl. No. 18/165,057, May 2, 2024, 12 pgs.
United States Patent and Trademark Office, "Final Office Action", U.S. Appl. No. 18/165,057, Sep. 25, 2024, 15 pgs.

* cited by examiner

* Wallet may comprise the Digital Asset

SELECTIVELY ACCESSING INFORMATION THAT IS STORED IN A DEVICE RESPONSIVE TO AN AUTHORITY OF A REQUESTING DEVICE

CROSS-REFERENCE TO RELATED APPLICATIONS

The present application is a continuation-in-part of U.S. patent application Ser. No. 18/165,057, filed Feb. 6, 2023, which claims the benefit of priority to U.S. Provisional Application No. 63/268,295, filed on Feb. 21, 2022, entitled "Insuring Against Malicious Tampering of Electronics", and to U.S. Provisional Application No. 63/269,315, filed Mar. 14, 2022, entitled "Systems/Methods of Insuring Against Malicious Tampering of Electronics Including a Digital Asset", the contents of which are incorporated herein by reference in their entirety as if fully set forth herein.

BACKGROUND OF THE INVENTION

It is expected that electronic devices will continue to proliferate with increasing wireless and/or wireline connectivity therebetween. Accordingly, wireless as well as wireline electronic traffic (well-intended as well as malicious) is expected to increase as we have indeed entered an era of a substantially interconnected society. Accordingly, an owner of a digital (or electronic) asset that resides in an electronic device (e.g., within a "wallet" of the electronic device) may benefit from an insurance against loss, theft or destruction (complete or partial) of the digital asset as may result from a malicious attack of said electronic device and/or wallet or from any other event. Protection against such loss or destruction may be provided, to some extent, via electronic and/or algorithmic means; i.e., via anti-virus, anti-phishing software. However, such electronic, software, and/or algorithmic protection may not be fool-proof. Accordingly, an owner of a digital asset may be willing to pay for additional protection via an insurance policy that may provide a safety net of restitution against loss or destruction of the digital asset as a result of malicious attack or any other event.

Fraud may be reduced substantially by using biometrics associated with a person in order to authenticate the person and enable an event or a transaction to take place by that person. Said biometrics associated with the person may be sensed and processed using a face recognition and/or any other technology such as, for example, a finger-print and/or voice recognition technology.

Fuel providing energy to transportation vehicles (e.g., cars, buses, motorcycles) has traditionally been fossil (e.g., gasoline, petroleum) but is changing to electric. A battery, that may be a rechargeable battery, may be built into a transportation vehicle and/or attached thereto and used to provide energy. However, a rechargeable battery may need an extended period of time to recharge, and this may be problematic in certain situations. Accordingly, a system/method is needed to provide electric energy/power to a transportation vehicle while avoiding said extended period of time to recharge.

SUMMARY OF THE INVENTION

According to some embodiments, a method is provided comprising: establishing a business, comprising selling an asset that is to be stored in an electronic device; and providing an insurance policy against malicious tampering of the electronic device and/or the asset therein that results in at least a partial loss and/or compromise of the asset.

According to some embodiments, said establishing a business comprises operating a business, a marketplace and/or an exchange.

According to further embodiments, said operating a business, a marketplace and/or an exchange comprises operating the business, marketplace and/or exchange on-line.

According to yet further embodiments, said selling an asset comprises selling a digital asset (DA); wherein said selling a digital asset (DA) comprises, according to some embodiments, selling a cryptocurrency and/or a Non-Fungible Token (NFT).

According to additional embodiments, said selling an asset that is to be stored in an electronic device comprises storing the asset in a secure location of the electronic device; wherein, according to some embodiments, the secure location comprises a crypto wallet; and wherein, according to further embodiments, the crypto wallet is downloaded into the electronic device by a user of the electronic device and/or by the business.

According to some embodiments, the electronic device comprises a computer and/or a smartphone that, according to yet other embodiments, comprises a wearable device.

According to further embodiments, the method provided further comprises: communicating between the business and the electronic device; wherein, according to some embodiments, said communicating comprises wirelessly communicating; and wherein said communicating comprises, according to some embodiments, communicating responsive to an attempt to access/tamper the asset that is stored in the electronic device.

According to yet additional embodiments, the method provided further comprises: informing the electronic device and/or the business of the attempt to access/tamper the asset that, according to some embodiments, comprises a digital asset (DA); wherein, according to some embodiments, the electronic device comprises: the digital asset (DA); one or more connections to one or more respective sensors; and an algorithm that allows access to the digital asset (DA) responsive to a state of said one or more respective sensors; wherein, according to further embodiments, said state comprises a plurality of states comprising a respective plurality of physiological and/or psychological states that are uniquely associated with the digital asset (DA); wherein, according to yet additional embodiments, a first state of said plurality of physiological and/or psychological states is associated with a first person and wherein a second state of said plurality of physiological and/or psychological states is associated with a second person.

According to yet other embodiments of the method provided, a first state of said plurality of states and a second state of said plurality of states are provided to the electronic device, and/or to an algorithm associated therewith and connected thereto, substantially simultaneously or simultaneously in time therebetween (i.e., substantially concurrently or concurrently therebetween).

Still according to additional embodiments of the method provided, a first state of said plurality of states and a second state of said plurality of states are provided to the electronic device and/or to an algorithm associated therewith and connected thereto, substantially sequentially in time therebetween or sequentially in time therebetween (i.e., substantially one after the other over respective first and second intervals of time that substantially do not overlap with one another (i.e., are substantially non-overlapping therebetween), or not at all overlapping therebetween, and may be adjacent to one another).

According to yet other embodiments, a first state of said plurality of states comprises a face recognition state, a second state of said plurality of states comprises a finger print state.

According to yet further embodiments, a first state of said plurality of states comprises a face recognition state, a second state of said plurality of states comprises a finger print state and a third state (besides, and in addition to, said first and second states) comprises a value/quantity other than said face recognition and other than said finger print.

Further yet, according to additional embodiments, a method comprises: providing an insurance policy against malicious tampering of an electronic device and/or malicious tampering of a wallet associated therewith (and/or may be contained therein) that results in a loss of an asset residing therein; and providing restitution responsive to at least a partial loss of the asset; wherein, according to some embodiments, said loss comprises theft/destruction; and wherein, according to some embodiments, said restitution comprises a sum of money.

According to additional embodiments, the method further comprises: renewing the insurance policy after a predetermined time lapse limit has been met.

In addition to the embodiments of methods summarized above, and in addition to any combination and/or variation thereof, embodiments of systems/apparatus may also be provided comprising an electronic device comprising, according to some embodiments, a digital asset (DA); one or more connections to one or more respective sensors; and an algorithm that allows access to the digital asset (DA) responsive to a state of said one or more respective sensors.

According to some embodiments, said state comprises a plurality of states comprising a respective plurality of physiological and/or psychological states that are uniquely associated with the digital asset (DA).

According to other embodiments, a first state of said plurality of physiological and/or psychological states is associated with a first person and wherein a second state of said plurality of physiological and/or psychological states is associated with a second person.

According to additional embodiments, a first state of said plurality of states and a second state of said plurality of states are provided to the electronic device substantially simultaneously in time with one another.

According to yet further embodiments, a first state of said plurality of states and a second state of said plurality of states are provided to the electronic device substantially sequentially in time with one another; wherein, according to some embodiments, a first state of said plurality of states comprises a face recognition state and wherein a second state of said plurality of states comprises a finger print state.

Many other embodiments of systems/methods are also possible based on the inventive concepts provided herein and/or based on combinations (partial or full) and/or variations thereof. For example, instead of (and, according to some embodiments, in addition to) the finger print state, a surface print state of any other body part (other than a finger) may be used; for example, a palm of a hand print. Further, a state/picture/print of an environment that is associated with a person may be used instead of, or in combination with any other state discussed herein; for example, a picture on a wall (that may be a specific wall of an office or other room, for example), a picture of a library or book shelve(s), a sound such as, for example a music being played and/or some other sound such as, for example, a voice and/or a tapping, etc.

Many different embodiments, besides those described/summarized herein, are possible in connection with the description, drawing(s), flowchart(s) and claims that are presented herein, as will be appreciated by those skilled in the art. It would be unduly repetitious and obfuscating to describe/illustrate/summarize every combination, variation and sub-combination of these embodiments. Accordingly, the present specification, including the present description/summary, drawing(s), flowchart(s) and claims shall be construed to constitute a complete written description of all combinations, sub-combinations and variations of embodiments and of the manner and process of making and using them, and shall support claims to any such combination, variation and/or sub-combination.

DETAILED DESCRIPTION

Systems/Methods of Insuring Against Tampering of Assets & Increasing Security of Transactions Via Biometrics According to inventive concepts disclosed herein, an entity (e.g., a business or a person) may purchase and/or install into an electronic device a digital asset ("DA") such as, for example, a Non-Fungible Token ("NFT"), a Crypto Currency ("CC") and/or any other digital asset (e.g., document, picture, algorithm, data, etc.) that is deemed valuable by said business or person. Accordingly, the digital asset may be insured at the time of purchase/installation/placement (or at a later time) by a company providing digital asset insurance ("DAI"). According to some embodiments, a company providing the DAI is also providing the digital asset that is purchased. In other embodiments, a first company provides the digital asset for purchase while a second company, that differs from the first and/or is associated with the first, provides the insurance for the DA.

In some embodiments, a coordinate (e.g., email address, phone number) of the company providing the DA for purchase and/or a coordinate of the company providing the DAI is/are associated, attached and/or connected with/to the purchased DA so that the DA may use a transceiver of an electronic device ("ED") that houses the DA (in some embodiments within a secure wallet of the ED), to communicate with the company that has provided the DAI and/or the DA. Such communications may, for example, be used to provide information regarding a number of accesses/attacks that the wallet/DA has been subjected to. Furthermore, according to some embodiments, an attempt to access the DA (for whatever purpose, legitimate or otherwise) may be reported, in substantially real time according to some embodiments, to the ED/DA, an owner of the ED/DA and/or to the business having sold/insured the DA. The flowcharts of FIG. 1 and FIG. 2 illustrate inventive concepts associated with the present invention.

Figure 1:
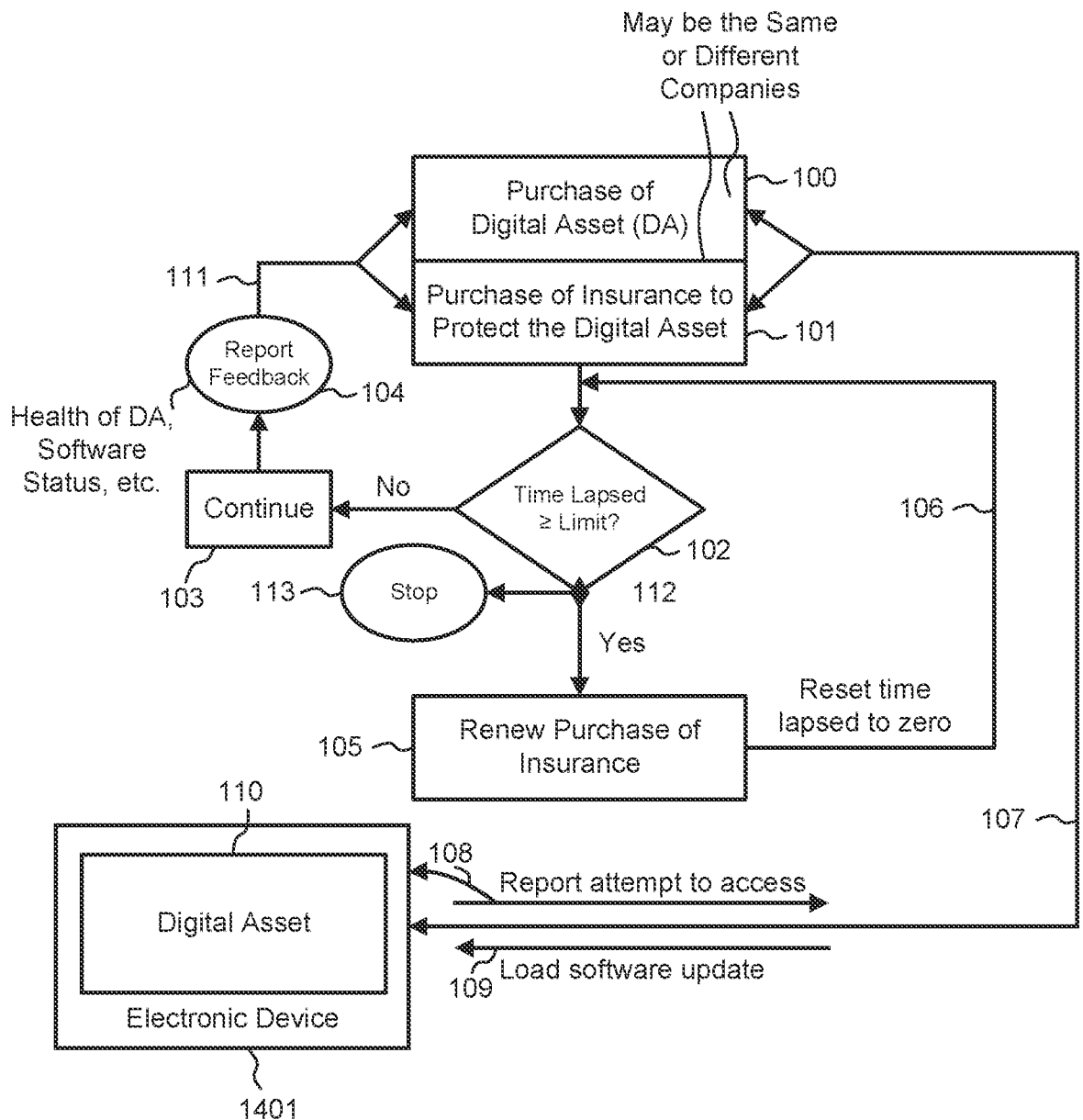
FIG. 1 is a block diagram flowchart of systems/methods according to embodiments of the invention.
Figure 2:
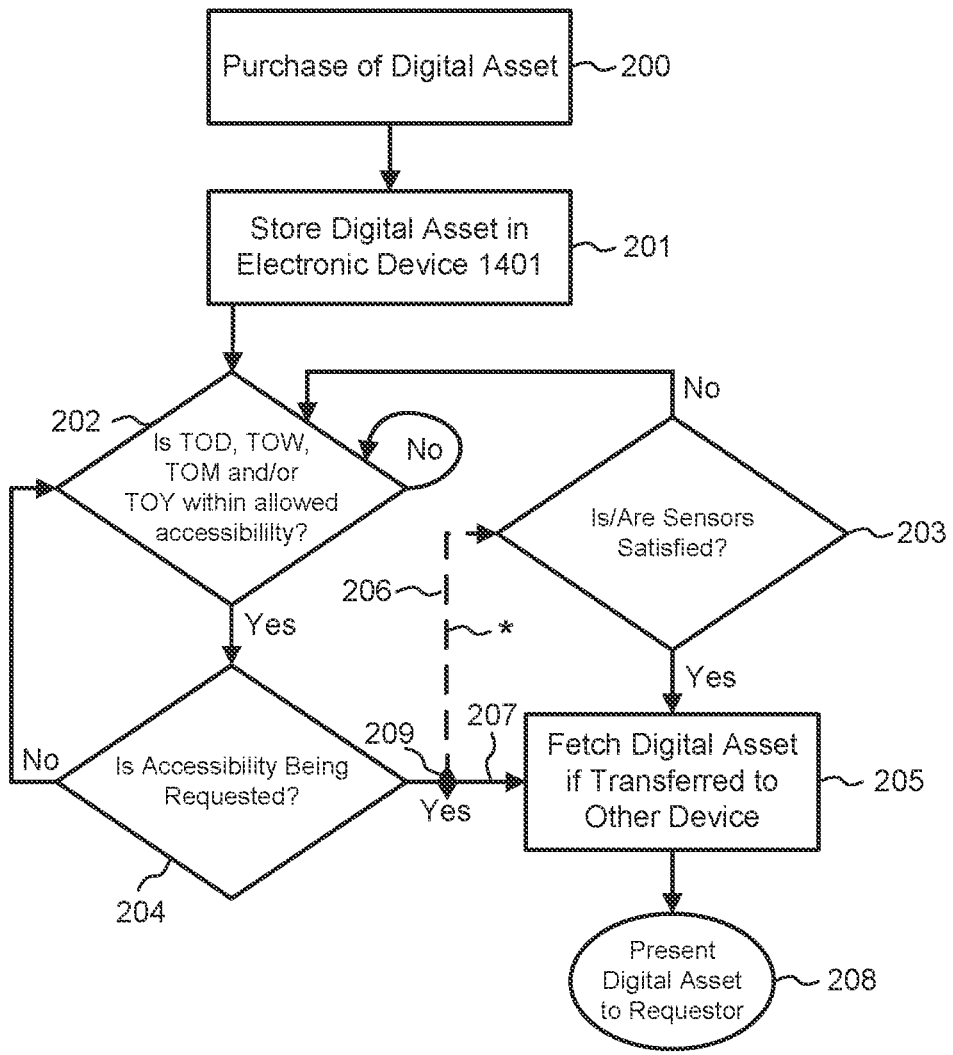
FIG. 2 is a block diagram flowchart of systems/methods according to embodiments of the invention.

Referring to FIG. 1, at block 100 a DA is purchased. At block 101 a DAI is purchased and associated with the purchased DA in order to insure against loss, damage, theft and/or malicious attack of the purchased DA. In some embodiments, the purchase of the DA and the purchase of the DAI occur simultaneously or substantially simultaneously therebetween. That is, an occurrence of a first one of the two events (e.g., an occurrence of the purchase of the DA) automatically triggers and/or activates an occurrence of a DAI to be purchased and/or be associated with the purchased DA. In further embodiments, a first entity is providing the DA for purchase and a second entity is providing the DAI for purchase. In some embodiments the second entity comprises the first entity (e.g., the second entity and the first entity are either one and the same entity or the second entity is affiliated/associated with the first entity); in other embodiments, the second entity differs from the first entity and/or is separate therefrom absent an affiliation or association therewith. In some embodiments, the first and second entities are operated by respective first and second business concerns that differ therebetween; whereas in other embodiments, the first and second entities are operated by the same business concern or by respective first and second business concerns that are affiliated/associated therebetween. In further embodiments, a purchase of a DA at block 100 is automatically accompanied by a purchase of a DAI at block 101 (e.g., a purchase of insurance and a purchase of a digital asset are bundled). It will be understood that the DAI may not be purchased at the time of purchase of the DA and, according to some embodiments, may not be purchased at all. It will further be understood that subject to an event whereby the purchased DA is sold by a first entity that owns the DA to a second entity, the DAI (if any) that is associated with the DA while the DA belongs to, and is an asset of, the first entity may transfer to the second entity as part of the sale. However, this need not be the case.

Following the purchase of the DA at block 100 and/or the purchase of the DAI at block 101 as described above, a time lapsed since said purchase(s) is examined at decision block 102 to determine whether or not the time lapsed has exceeded (or is equal to) a Limit; wherein the Limit may comprise any interval of time such as, for example, X number of days, Y number of months and/or Z number of years. If the time lapsed as examined at decision block 102 is equal to the Limit, or has exceeded the Limit, a further examination at the small solid diamond 112 "♦", at the bottom of diamond block 102, may be used to determine whether or not the DAI is to be renewed. If the examination/inquiry at/by the small solid diamond 112 "♦" determines that the DAI is to be renewed (as may be dictated, authorized and/or ordered by the entity that owns the DA and/or by any other authority), then the DAI is renewed at block 105, the time lapsed is reset to zero, path 106 redirects algorithmic operation into diamond block 102 and the flowchart algorithm continues therefrom. If the examination (or inquiry) at/by the small solid diamond 112 "♦" determines that the DAI is not to be renewed, the flowchart algorithm stops at block 113. Returning now to decision block 102, if the time lapsed as examined at decision block 102 is less than the Limit, the flowchart algorithm continues at block 103 by, according to some embodiments, providing feedback via path(s) 111 to block 100 and/or to block 101 (e.g., to the entity that sold the DA and/or to the entity that sold the DAI). Said feedback may include a health status report on the DA and/or on whether or not the DA has been tampered with (including attempted pampering and/or actual tampering). The feedback may also include a software status report relating to the DA and/or the DAI and/or whether or not the software status needs updating. Following the above, the flowchart algorithm continues at decision block 102 as described earlier.

It will be understood that a comparison of time lapsed, being greater than or equal to the Limit, as is illustrated in decision block 102, may be performed at any frequency desired; e.g., once per second, once per minute, once per hour, once per day, once per month, once per year and/or at any other frequency (or time interval between comparisons). In some embodiments, said frequency comprises a periodicity. In other embodiments, the frequency (or time interval between comparisons) comprises a non-periodicity wherein comparisons occur at irregular intervals of time and/or at intervals of time that are pseudo-randomly spaced from one another. In further embodiments, said frequency (or time interval between comparisons) comprises a periodicity over a first duration of time and a non-periodicity over a second duration of time.

Still referring to FIG. 1, communications path 107 between blocks 100/101 and electronic device 1401, to which DA 110 is attached/connected, may be used in some embodiments to provide the DAI to the electronic device 1401 and/or to the DA 110. The communications path 107 may also be used to provide one or more software updates 109 to the electronic device 1401 and/or to the DA 110, as well as information report(s) 108 to blocks 100/101/1401. The information report(s) may, for example, include information relating to one or more accessing events (e.g., time-of-day during which the DA has been accessed and/or by whom the DA was accessed) as well as a report on the health status of the DA/DAI and/or on whether or not the DA/DAI has been tampered with (including attempted tampering and/or actual tampering), as previously described. The information report(s) may be relayed to blocks 100/101, wirelessly and/or via non-wireless means, via communications path 107, and the information reports may also be stored/provided in/to electronic device 1401 (as is further described below in reference to FIG. 3) and/or DA 110, as is illustrated by path 108.

Figure 3:
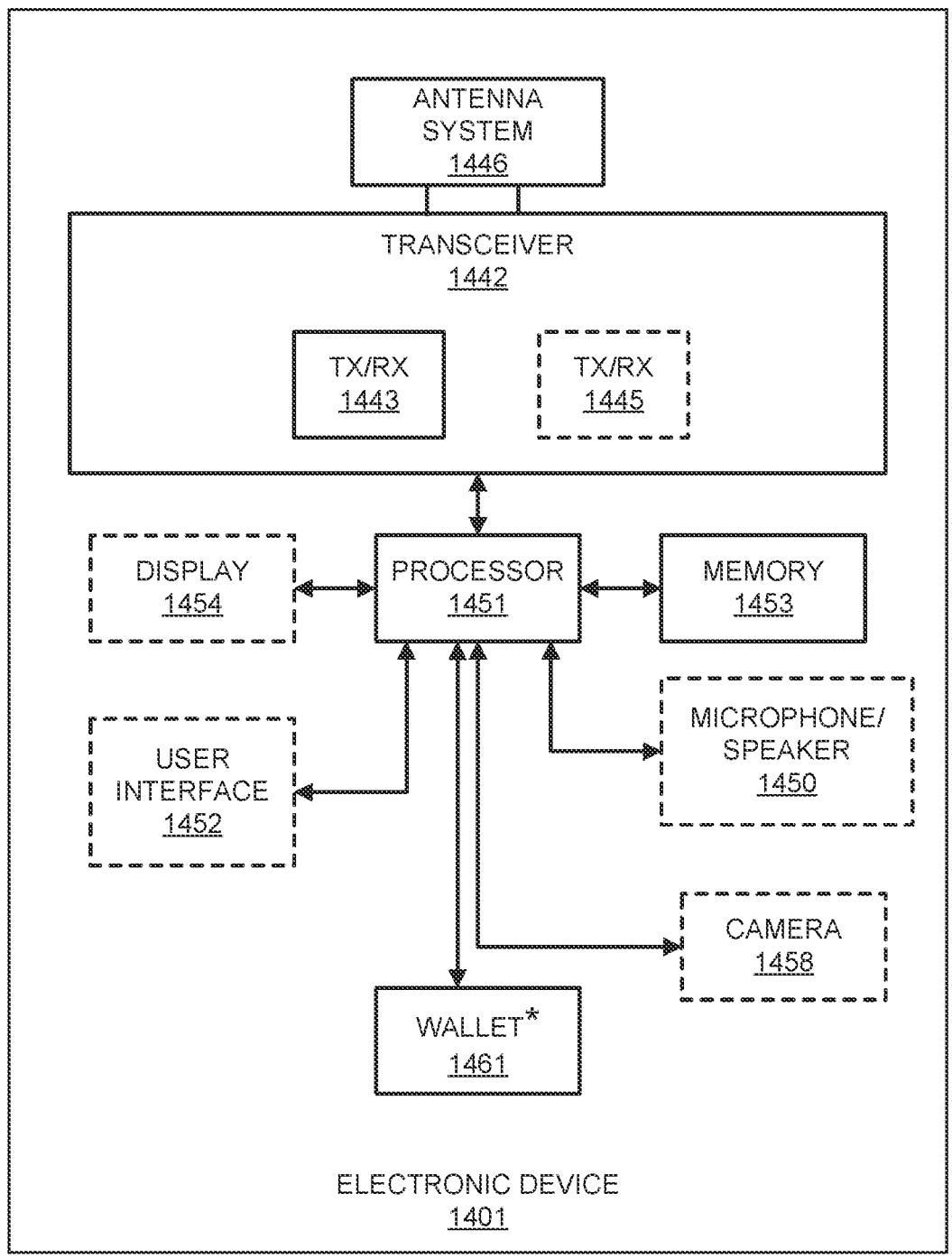
FIG. 3 is a block diagram of a device configuration comprising a wallet and/or a digital asset in accordance with various embodiments of the invention.

FIG. 3 illustrates a block diagram of the electronic device 1401 of FIG. 1 that may, according to embodiments of the present invention, include a DA such as the DA 110 of FIG. 1. Any electronic device comprising a transmitter Tx and/or a receiver Rx, may include components of the electronic device 1401. For example, the electronic device 1401 may be a wireless electronic device, such as, for example, a smartphone, a smartwatch, a tablet/pad computer, or a laptop computer, etc. Alternatively, or in combination with the above, the electronic device 1401 may comprise wireline connectivity.

As is illustrated in FIG. 3, an electronic device 1401 may include an antenna system 1446, a transceiver 1442, a processor (e.g., processor circuit) 1451, a wallet 1461 that may include the DA 110 of FIG. 1 and a memory 1453. Moreover, the electronic device 1401 may optionally include a display 1454, a user interface 1452, a microphone/speaker 1450, and/or a camera 1458.

A transmitter portion of the transceiver 1442 may convert information, which is to be transmitted by the electronic device 1401, into electromagnetic signals suitable for radio communications (i.e., wireless communications) and/or into wireline/cable/optical signals suitable for transmission over a non-wireless and/or wireless medium. A receiver portion of the transceiver 1442 may receive and/or demodulate signals that are received by the electronic device 1401. The transceiver 1442 may include transmit/receive circuitry (TX/RX) that provides separate communication paths for supplying/receiving signals to different elements of the transmission/reception (e.g., antenna system) 1446. Accordingly, when the antenna system 1446 includes two antenna elements, the transceiver 1442 may include two transmit/receive circuits 1443, 1445 connected to different ones of the antenna elements via respective RF feeds. For example, the transmit/receive circuit 1443 may be connected to a Wi-Fi antenna or a close/short-range (e.g., a BLUETOOTH® or Wi-Fi) antenna, whereas the transmit/receive circuit 1445 may be connected to a cellular antenna.

Still referring still to FIG. 3, the memory 1453 can store computer program instructions that, when executed by the processor circuit 1451, carry out operations of the electronic device 1401. In some embodiments, the memory 1453 can be a non-transitory computer readable storage medium including computer readable program code therein that when executed by the processor 1451 causes the processor 1451 to perform a method or step/function (or combination of methods or steps/functions) as described herein. The memory 1453 can be, for example, a non-volatile memory, such as a flash memory, that retains the stored data while power is removed from the memory 1453.

Figure 4:
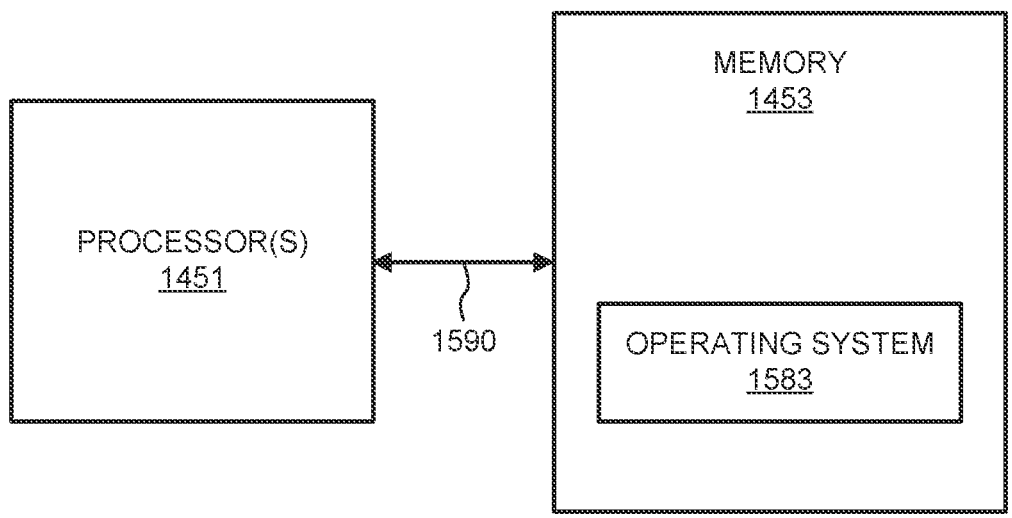
FIG. 4 is a block diagram of elements of a device configuration in accordance with various embodiments of the invention.

FIG. 4 illustrates a block diagram of an example processor 1451 and memory 1453 that may be used in accordance with embodiments of the present inventive concepts. The processor 1451 communicates with the memory 1453 via an address/data bus 1590. The processor 1451 may be, for example, a commercially available or custom microprocessor. In some embodiments, the processor 1451 may be a digital signal processor. Moreover, the processor 1451 may include multiple processors. The memory 1453 is representative of the overall hierarchy of memory devices containing the software and data used to implement various functions as described herein. The memory 1453 may include, but is not limited to, the following types of devices: cache, ROM, PROM, EPROM, EEPROM, flash, Static RAM (SRAM), and Dynamic RAM (DRAM).

Referring still to FIG. 4, the memory 1453 may hold various categories of software and data, such as an operating system 1583. The processor 1451 and memory 1453 may be part of the electronic device 1401. Accordingly, the operating system 1583 can control operations of the electronic device 1401. In particular, the operating system 1583 may manage the resources of the electronic device 1401 and may coordinate execution of various programs by the processor 1451.

In some embodiments, the electronic device 1401, that comprises (or includes) the DA 110 in wallet 1461 thereof (see FIG. 1/FIG. 3), wallet 1461 itself and/or the DA 110 itself may comprise software that may be used to allow access/use of the DA 110 responsive to (and in some embodiments, only responsive to) one or more sensors having sensed a biometric, physiological and/or a psychological parameter of an entity that may be a living organism. The living organism may be a person and the one or more sensors may be connected to the DA 110, to a device that comprises/includes the DA 110 (e.g., such as device 1401) and/or to another device that may be connected to device 1401 (and/or to DA 110). Said another device may be associated and/or registered with the owner of the DA 110. In some embodiments, said one or more sensors comprises a plurality of sensors not all of which are on (or attached to) one device. For example, a first device may comprise a first sensor (e.g., a face recognition sensor) while a second device may comprise a second sensor (e.g., a fingerprint sensor and/or a voice recognition sensor). In accordance with some embodiments, the first device (e.g., device 1401) may comprise a computer (e.g., a lap-top or a pad/tablet computer) while the second device may comprise a smartphone and/or a smartwatch. One or more outputs of said one or more sensors may be connected (wirelessly and/or otherwise) to the device that includes the DA and/or directly to the DA.

The biometric, physiological and/or psychological parameter may comprise a temperature, a respiration, a heart-rate, a contour of a face/eye/mouth/nose, a voice, a sound, a fingerprint, an expression (that may be a facial expression), that may, according to some embodiments, be predetermined to convey a specific message and/or any other biometric, physiological and/or psychological parameter that may be sensed by the one or more sensors that may comprise, for example, one or more fingerprint sensors that may be embodied, for example, on a computer and/or a smartphone device. An acceptable sensed value (or plurality of values, that may be sensed sequentially, one after another, or substantially simultaneously therebetween) of said biometric, physiological and/or psychological parameter may be determined by one or more prestored, predetermined values of said biometric, physiological and/or psychological parameter and/or by any other algorithm, that may be an Artificial Intelligence ("AI") algorithm. Said acceptable sensed value, that may allow said DA to be accessed/used, and/or may allow a device that comprises the DA (or does not include the DA) to execute an algorithm that otherwise would not be allowed to be executed (such as, for example, allowing a user of the device to, for example, vote for a candidate running for office), may be stored within the device that includes the DA (or does not include the DA), within the DA itself and/or within some other device that may be connected to the device that includes the DA (or does not include the DA) and/or to the DA itself.

In some embodiments, the device that comprises the DA (and/or the DA itself) comprise(s) software that allows said living organism (that may be a person) to cast a vote responsive to an authentication of the living organism as may be provided by said sensing of the biometric, physiological and/or psychological parameter associated therewith. In some embodiments, said vote may be compared to/with one or more other votes of one or more other persons/entities and, responsive to such examination (or comparison), an event/action/transaction may be allowed to occur responsive to all votes agreeing with one another, responsive to a majority of votes agreeing with one another, only (and exclusively) if all votes agree with one another and/or only if a majority of votes agree with one another. In some embodiments, the one or more sensors comprises at least one fingerprint sensor, a voice recognition sensor, a contour/face/eye/mouth/nose recognition sensor (not to the exclusion of any other sensor such as, for example, a temperature sensor, a respiration sensor, a heart-rate sensor, a sound sensor, an expression (that may be a facial expression) sensor and/or any other biometric, physiological and/or psychological parameter sensor that may be sensed by the one or more sensors. A plurality of sensors may, according to some embodiments, be configured to function substantially concurrently therebetween (i.e., substantially concurrently in time with one another) or sequentially in time therebetween in order to authenticate a user/person/entity.

In addition to the above, or in lieu of the above, at least one sensor of said plurality of sensors or, as may be the case in some embodiments wherein a device comprises only one sensor, the sensor (either said only one sensor or the at least one sensor of said plurality of sensors) may, according to some embodiments, be configured to sense/measure, sequentially in time, a parameter (such as, for example, a fingerprint parameter) and examine, in conjunction with processing provided by, for example, a processor and/or memory associated therewith, whether or not the sequentially in time sensed/measured parameter satisfies a predetermined criterion as may be stored in said processor and/or memory associated therewith. For example, let's assume that a device (such as, for example, a lap-top computer) comprises a plurality of sensors, say four (4) fingerprint sensors. Further, let's assume that a user of the device has configured the device to use all of its four (4) sensors substantially simultaneously in time and thus sense/measure four (4) fingerprints in accordance with, for example, the following predetermined (by the user) configuration of finger positions: finger #1 on sensor #1; finger #7 on sensor #2; finger #4 on sensor #3; and finger #5 on sensor #4. Accordingly, having sensed/measured by the four (4) sensors the four (4) fingerprints of the associated four (4) fingers, as specified above, if a match of sensed/measured fingerprints is detected vis-à-vis four (4) prestored respective fingerprints of the user, then, and only then, the device (the lap-top computer in this example) would allow the user to proceed with whatever next step the user initiates.

Continuing with the present example, instead of the above, or in addition to the above, the user of the device (or a second user of the device) may configure, according to some embodiments, the device to use, say sensor #3, and to sequentially in time sense/measure, using sensor #3, the fingerprint of finger #1; followed by the fingerprint of finger #7; followed by the fingerprint of finger #4; followed by the fingerprint of finger #5; and if a match of the sequentially in time sensed/measured fingerprints is detected (in the order specified and only in the order specified) vis-à-vis four (4) prestored respective fingerprints of the user, then, and only then, the device (the lap-top computer in this example) would allow the user to proceed with whatever next step the user initiates. If the match is detected by sensor #3 but not in the order specified (i.e., the fingerprint of finger #1 matching a prestored fingerprint of finger #1; followed by the fingerprint of finger #7 matching a prestored fingerprint of finger #7; followed by the fingerprint of finger #4 matching a prestored fingerprint of finger #4; followed by the fingerprint of finger #5 matching a prestored fingerprint of finger #5) then, according to some embodiments, the device (e.g., an algorithm associated therewith) may be configured to refuse to allow the user to proceed with whatever next step the user wants to initiate. According to additional embodiments, however, if the match is detected by sensor #3 (and/or by any other sensor of the device or another device that is connected, wirelessly and/or otherwise (i.e., non-wirelessly) to the device) but not in the order specified, then, according to these additional embodiments, the device (e.g., the algorithm associated therewith) may be configured to allow the user to proceed with (instead of blocking) whatever next step the user initiates. Combinations and/or variations of the above are also possible as will occur to those skilled in the art.

According to yet further embodiments, a device that has received an input ("an original input") via one or more sensors that are connected therewith, may be configured to relay such input to an entity that the device trusts (such as, for example, a government entity, an exchange, a financial institution and/or a business that has provided the digital asset to the device) and, responsive to the device having provided the input to the entity, receive from the entity a request/recommendation for further action by the device. The request/recommendation for further action may be sent/received directly to/at the device and/or may be sent/received indirectly to/at the device via another device that is configured to communicate with the device. The request/recommendation may, according to some embodiments, be to provide the input (the same input) once again to the device and/or, according to further embodiments, to provide a different input to the device with or without the original input.

Many different embodiments, besides those described herein, are possible in connection with the description, drawing(s), flowchart(s) and claims that are presented herein, as will be appreciated by those skilled in the art. It would be unduly repetitious and obfuscating to describe/illustrate every combination and sub-combination of these embodiments. Accordingly, the present specification, including the drawing(s), flowchart(s) and claims shall be construed to constitute a complete written description of all combinations and sub-combinations of embodiments and of the manner and process of making and using them, and shall support claims to any such combination and/or sub-combination.

It will be understood that the term "concurrently" or "substantially concurrently" as used herein comprises performing two events over respective first and second segments of time that are substantially overlapping with one another; and said "sequentially" or "substantially sequentially" comprises performing two events over respective first and second segments of time that are substantially successive and non-overlapping with one another substantially of non at all (i.e., "one substantially follows the other").

It will also be understood that the term "entity" as used herein includes organisms that occur in nature as a result of evolution and/or selective breading, such as, for example, animals/humans; and further includes organisms that are made and are not based on evolution and/or selective breading; such organisms may comprise Artificial Intelligence ("AI"), such as, for example, may be the case with robots, electromechanical machines/algorithms and/or computers. The term "entity" may also include hybrid organisms comprising a biological component (i.e., a component occurring in nature as a result of evolution and/or selective breading) and an engineered component (i.e., a component that is made and is not based on nature's evolution and/or selective breading).

In further embodiments, in combination with the above or in lieu of the above, the DA, a device that includes the DA and/or another device that is connected therewith comprises software that allows the DA to be accessed/used during certain time intervals (that may be associated with certain time interval(s) of certain day(s)/month(s)/year(s)) and prevents the DA (and/or any software or algorithms associated therewith) from being accessed and/or used during certain other time intervals (that may, or may not, be associated with said certain day(s), month(s) and/or year(s)). Said prevents the DA from being accessed and/or used during certain other time intervals may comprise, according to some embodiments, erasing/deleting the DA from the device that includes the DA. According to some embodiments the DA may be erased/deleted from a first device that includes the DA and stored within one or more other devices in accordance with a convention/understanding that may be, according to some embodiments, a predetermined convention/understanding (or a priori established convention/understanding) between the first device and said one or more other devices; wherein said erased/deleted may comprise locking in-place and making the DA inaccessible (within the first device) without erasing/deleting therefrom.

According to further embodiments, said one or more other devices may be chosen pseudo-randomly from a plurality of devices that function in accordance with said convention/understanding. In some embodiments, the one or more other devices may be changed from a first set of one or more other devices to a second set of one or more other devices. In some embodiments, the first set and the second set may respectively comprise a first number of devices and a second number of devices that may or may not differ therebetween and/or the change from the first set to the second set may occur periodically in time (e.g., at regular intervals of time), non-periodically in time (e.g., at non-regular intervals of time) and/or pseudo-randomly. According to some embodiments, said plurality of devices that function in accordance with said convention/understanding may be determined (or identified) by: soliciting by a first device that may include the DA, a processing capability from a second device; receiving by the first device, from the second device, an acknowledgement that the second device is configured to provide the processing capability; and receiving by the first device the processing capability from the second device; wherein said soliciting comprises communicating and/or exchanging information bidirectionally or unidirectionally between the first and second devices. In some embodiments, the processing capability comprises executing an algorithm by the second device on behalf of the first device. In some embodiments, said executing an algorithm comprises using a computer, a digital signal processor and/or a memory of the second device to achieve a step (or result) on behalf of the first device and/or transmitting information by the second device in order to achieve a step, result (or relay information) on behalf of the first device.

A value associated with a digital asset (such as a value associated with a NFT and/or a crypto currency) may vary day-by-day (or even minute-by-minute). An entity, such as an insurance company (that may be privately owned or operated by a government agency), providing insurance for said digital asset, may charge an owner of the digital asset for such insurance based on such a fluctuation. That is, over a first interval of time during which the value of the digital asset is, say, $100,000.00, the insurance premium therefor may be $13.70/day. Over a second interval of time during which the value of the digital asset is, say, $75,000.00, the insurance premium associated therewith may drop to $8.22/day. Accordingly, if, for example, the first interval of time lasts for 20 days and the second interval of time spans the remainder of the associated year (e.g., lasts for 345 days), the insurance premium for the associated year would be:

($13.70×20)+($8.22×345)=$274.00+$2,835.90=$3,109.90.

It will be understood that, instead of basing the insurance premium calculation on a granularity of a day, as in the above example, any other granularity may be used such as, for example, an hourly granularity, a half-hour granularity, a 15-minute granularity, a minute-by-minute granularity, etc. During a granularity interval, an average value of the digital asset and/or an average value of an insurance premium associated therewith may be used.

Returning now to said erasing/deleting a DA from a first device that includes the DA and storing the DA within one or more other devices, as described above, may comprise erasing/deleting the DA from the first device that includes the DA (or "freezing" and/or disabling the DA within the first device and thus preventing access thereof from the first device) and storing the DA within a plurality of other devices. According to some embodiments, said storing the DA within a plurality of other devices may comprise storing a portion of the DA (but not the DA in its entirety) within certain devices of said plurality of other devices and/or storing the DA in its entirety within certain devices of said plurality of other devices. Accordingly, a plurality of copies of the DA may be associated with said plurality of other devices and subjecting to tampering one or more copies of the DA stored in one or more respective devices, up to a largest minority of copies, may be detected via a comparison of the copies. Based on the comparison of the copies, a majority of copies comprising identical or similar characteristics therebetween may, according to some embodiments, be assumed to include an authentic form/representation of the DA. In accordance with some embodiments of the invention, the DA may be stored (either partially or in whole) in a block chain. In some embodiments, a first portion of the DA may be stored in a first block chain and a second portion of the DA may be stored in a second block chain. It will be understood that the term "portion of the DA" as used herein above includes the entire DA according to some embodiments.

FIG. 2 illustrates elements of a method/algorithm that may be used in order to access a DA (or prevent access to the DA). As used herein TOD means time of day; TOW means time of week; TOM means time of month; and TOY means time of year. Accessibility of the DA may be restricted to certain/specific intervals of time as defined by TOD, TOW, TOM and/or TOY. A Global Positioning System ("GPS") and/or other means, may be used to determine said TOD, TOW, TOM and/or TOY. Accordingly, an owner of the DA (or other person/entity) may determine/specify the TOD, TOW, TOM and/or TOY during which access to the DA may be allowed. Referring now to FIG. 2, decision block 202 is illustrative of examining a time interval associated with providing, or precluding, an opportunity to access the DA responsive to a value of TOD, TOW, TOM and/or TOY. If accessibility is being requested (at decision block 204), an examination of a state of one or more sensors may be used to allow or deny accessibility. According to some embodiments, said one or more sensors may be connected (directly and/or indirectly) to the device that includes the DA and said device that includes the DA may be configured to allow or deny access to the DA responsive to whether or not one or more predetermined physiological/psychological state(s)/value(s) are being satisfied by said one or more sensors. Accordingly, if accessibility of the DA is being requested at diamond block 204, the small solid diamond 209 "♦", following the "YES" exit of diamond block 204, may be used in some embodiments to determine a configuration of the device that includes the DA (such as device 1401) and, if said configuration comprises/requires an examination of said one or more sensors, to examine the one or more sensors at decision block 203; otherwise, to continue at block 205 as is illustrated in FIG. 2.

Block 205 of FIG. 2 illustrates accessing/fetching the DA from one or more other devices (other than device 1401) to which the DA may have been transferred (or unlocking the DA from within device 1401 or wallet 1461 in the event the DA has remained locked within device 1401 or wallet 1461). Then, at block 208, the DA is presented to the entity/person/machine that has requested the DA. It will be understood that according to some embodiments said accessing/fetching comprises a comparison of DA copies that are accessed/fetched from a respective plurality of other devices (as previously described), for the purpose of identifying a majority of DA copies comprising identical or similar characteristics therebetween that may, according to some embodiments, be assumed to include an authentic form/representation of the DA.

It will be understood that the term DA as used herein may, according to some embodiments, include any information that may be stored/included in an electronics system/device. Said any information may comprise a program, algorithm, flowchart, figure, data, software, firmware and/or hardware and said system/device may comprise a computer comprising a lap-top computer, a desk-top computer, a pad/tablet computer, a smartphone, smartwatch and/or any other electronic system/device that may be wearable or not.

Figure 5:
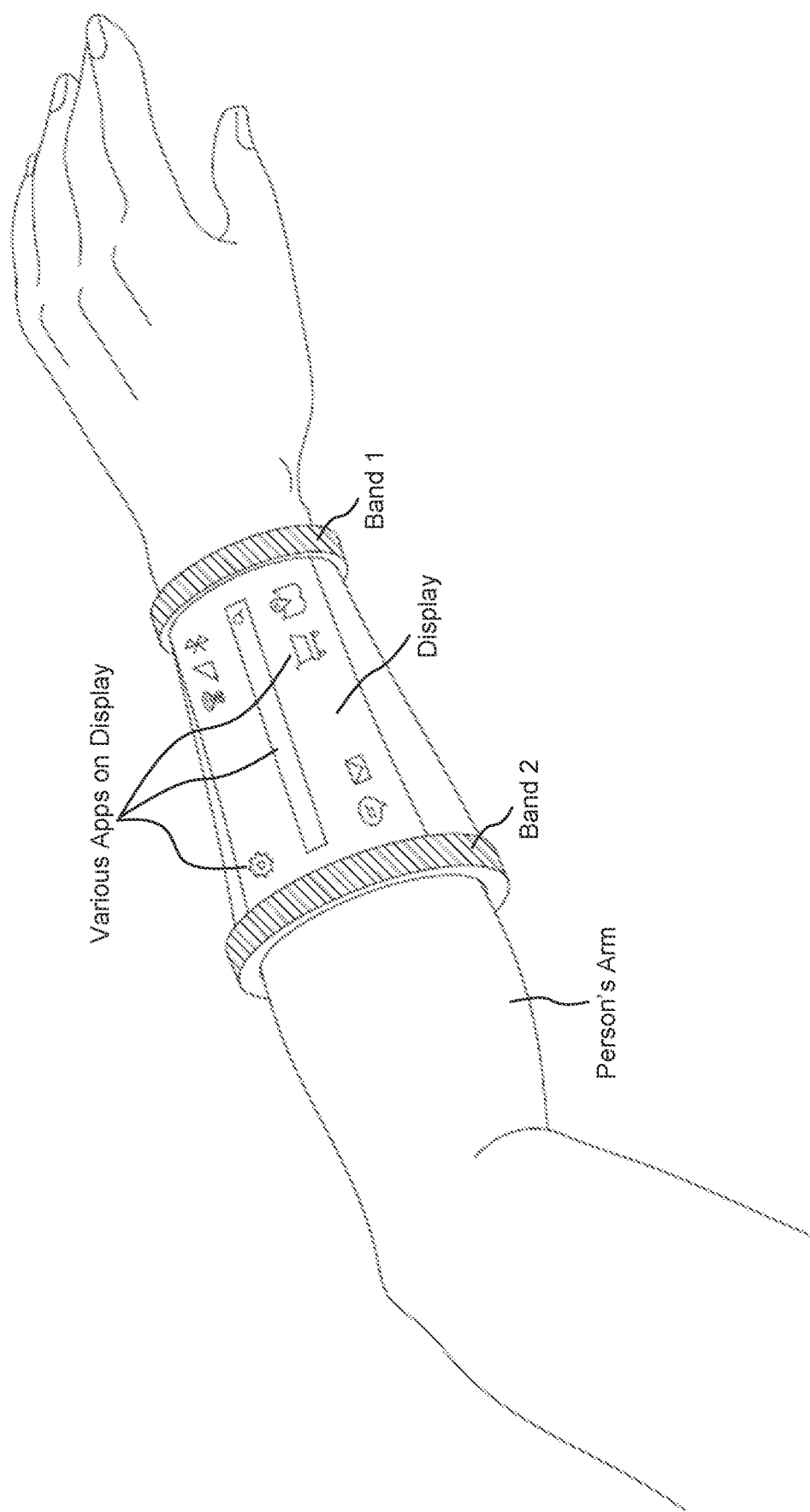
FIG. 5 is an illustrative diagram of a wearable system/device in accordance with various embodiments of the invention.

According to further inventive concepts of the present invention, a wearable system/device may be provided that may, for example, comprise a smartphone, a computer and/or any other device/functionality and may further comprise at least some features/functions of device 1401 as is illustrated in FIG. 3 and FIG. 4. The wearable system/device may, according to some embodiments, comprise a non-rigid, bendable, elastic, deformable, soft, and/or malleable display in an overall configuration as is illustrated in FIG. 5. As is illustrated in FIG. 5, band 1 and/or band 2 of the wearable system/device may be used to attach the wearable system/device onto, for example, a person's arm. Further, band 1 and/or band 2 may include electronics associated with the wearable system/device and/or a battery therefor. The display may be attached to at least one of band 1 and band 2, and the display may follow a contour as defined by the person's arm (or other body part), responsive to the display's non-rigid, bendable, elastic, deformable, soft and/or malleable characteristic.

The wearable system/device may further comprise one or more sensors, that may include one or more biometric sensors, that may be used for monitoring, measuring and/or controlling one or more parameters/quantities associated with a person to whom the wearable system/device is attached to. According to some embodiments, said controlling the one or more parameters/quantities associated with the person to whom the wearable system/device is attached to comprises: attaching/connecting/coupling the wearable system/device to a dispensing device that is also attached to the person and attaching/connecting/coupling the dispensing device and/or the wearable system/device to a computer; wherein the computer is configured to analyse information associated with the health/functionality of the dispensing device and make adjustments (as needed) thereto; and wherein the computer is further configured to analyse one or more measurements provided thereto by the wearable system/device and communicate with the dispensing device to administer a quantity of medication to the person in accordance with a medical practice that may benefit the person's health. It will be understood that according to some embodiments, the wearable system/device communicates with the computer (bi-directionally) using cellular, microwave, infrared, unlicensed and/or Wi-Fi frequencies (not necessarily to the exclusion of wireline, cable and/or fibre-optical means) while the wearable system/device communicates with the dispensing device and transmits thereto information received from the computer using a short-range link (based on Bluetooth technology and/or any other technology). The wearable system/device may also be configured to relay to the computer information received from the dispensing device over the short-range link, comprising diagnostics and/or functionality associated with the dispensing device.

According to other embodiments, the wearable system/device comprises the dispensing device. Further, according to some embodiments, the wearable system/device and/or the dispensing device may comprise one or more sensors and/or one or more digital assets, as previously discussed. According to further embodiments, a monitor may be integrated with the dispensing device and/or with the wearable system/device. The monitor may include one or more sensors that are configured to monitor/measure one or more biometric parameters. Further, the monitor may be configured to communicate with the dispensing device and/or the wearable system device wirelessly and/or otherwise (e.g., wireline). Other combinations are also possible as will occur to those skilled in the art. For example, according to some embodiments, the wearable system/device may comprise (and may be integrated with) the dispensing device and/or the monitor. According to other embodiments, the dispensing device may comprise (and may be integrated with) the monitor. Other combinations are also possible such as, for example, the wearable system/device comprising the monitor while the dispensing device is maintained as a stand-alone device and external thereto but configured to communicate therewith. The dispensing device and/or the monitor may, according to some embodiments, include a display and/or a man-machine interface.

The wearable system/device may be configured with one or more modes of vibration, one or more emitting elements (such as, for example, light-emitting diodes (or "LEDs")) and/or with one or more modes of sound. The wearable system/device may, according to some embodiments, allow a user thereof to configure it so as to associate a specific meaning to a specific vibration, emission and/or sound thereof. For example, a repeating on, off vibration followed by an on, off red LED emission may be associated with, and defined to represent, an out-of-range and/or marginal measurement of blood glucose.

Providing Energy to Motor Vehicles

Figure 6:
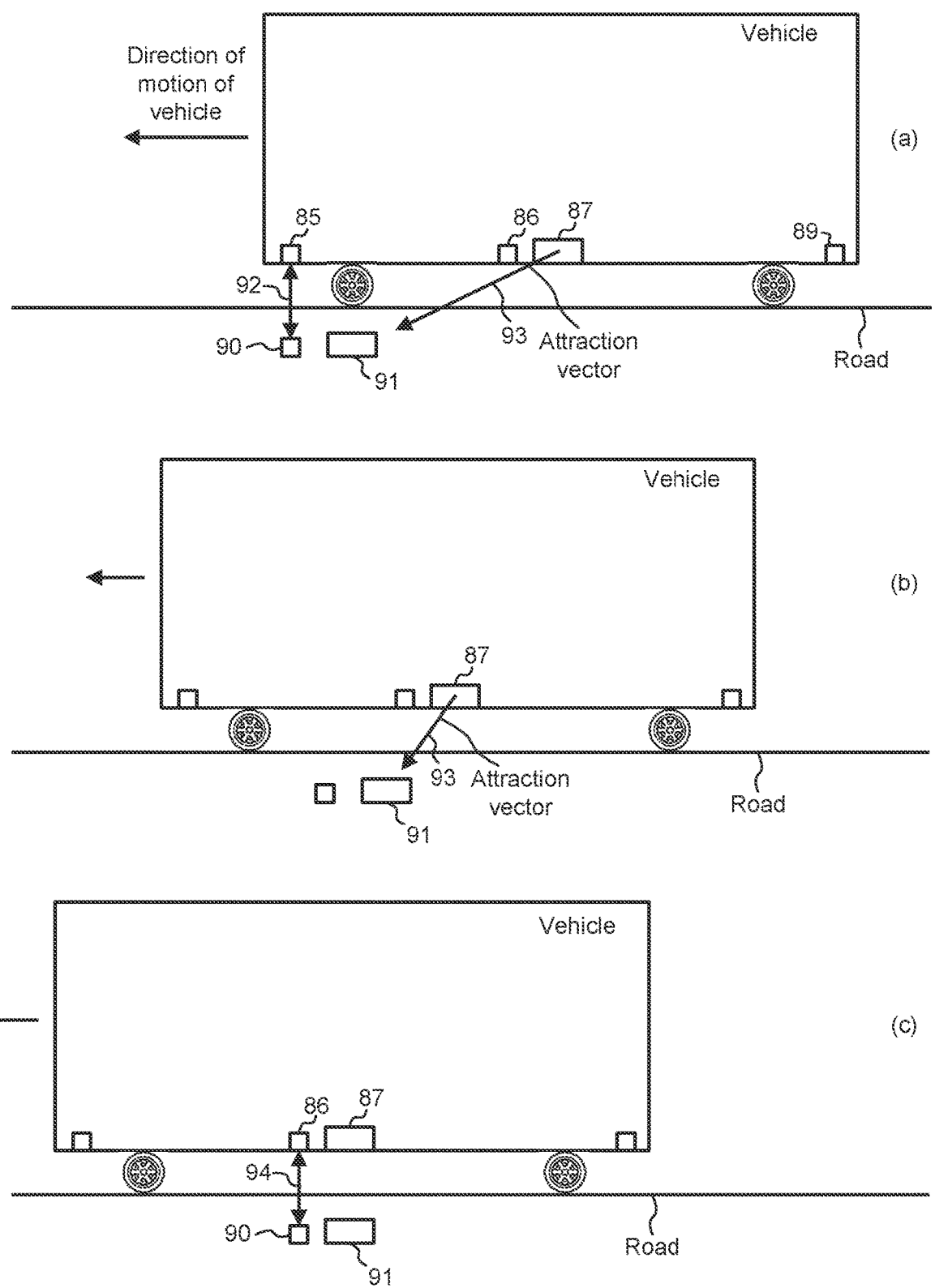
FIG. 6 is illustrative of systems/methods of providing energy to a vehicle according to embodiments of the invention.

A vehicle, such as, for example, a car (e.g., an automobile) or a bus, may comprise a magnet that may, according to some embodiments, be located at a maximum (or near maximum) proximity to a road or highway. In some embodiments, the magnet may be situated on/at the bottom of the vehicle so as to be at said maximum (or near maximum) proximity to the road or highway. The road or highway may comprise one or more sensors and/or, according to some embodiments, a substantially periodic array of sensors that may be used to sense/detect a location of the vehicle as the vehicle traverses/travels over the road or highway. The road or highway may also comprise one or more magnets and/or, according to some embodiments, a substantially periodic array of magnets, each one of which may comprise an electromagnet whose polarity and/or magnetic field intensity (or polarity) may be changed (e.g., may be increased or decreased) by, for example, changing a current passing through a coil associated therewith, and may, according to some embodiments, the magnetic field intensity and/or polarity thereof, may be responsive to a position of the vehicle. The position of the vehicle may be sensed/detected by one or more sensor(s) of the road and/or by one or more sensors of said periodic array of sensors by sensing/detecting a tag/barcode of the vehicle and/or by sensing/detecting an emission of the vehicle that may be based on a near-field communications technology/protocol and/or on any other technology/protocol. FIG. 6 is illustrative of embodiments based on the above.

As is illustrated in FIG. 6, a vehicle may be equipped with at least one permanent magnet 87 and with at least one other device 85, 86, 89 that may be configured to radiate (or emit) a signal. The signal may include an identity of the vehicle, that may be unique to the vehicle, so that the signal that is radiated/emitted may be read/sensed by a sensor of the road and then used to charge an account (e.g., a bank account) associated with the vehicle and/or a person associated with the vehicle. According to some embodiments, the signal may be devoid of radiation/emission and may simply be/comprise a barcode that may be read/detected by the road sensor as the vehicle/barcode approaches the road sensor and/or passes over the road sensor. In other embodiments, the sensor of the road may be configured to trigger at least one device of the at least one other device 85, 86, 89 to radiate/emit the signal responsive to an activation command received at a device of the at least one other device 85, 86, 89 from the sensor of the road as a device of the at least one other device 85, 86, 89 approaches the sensor of the road. Combinations of the above are also possible; e.g., radiating/emitting, per any one of the above embodiments, as well as using the barcode embodiment.

Referring to FIG. 6, a vehicle is illustrated traveling over a road in the direction that is illustrated by the arrow labelled "direction of motion of the vehicle". As is illustrated in FIG. 6, the road is equipped with an electromagnet 91 and a sensor 90 that, according to some embodiments is positioned relatively close (e.g., proximate) to the electromagnet 91. Accordingly, the electromagnet 91 may be activated responsive to, for example, the road sensor 90 (and/or any other sensor) having detected the presence of device 85. The electromagnet 91 may be activated by energizing a coil associated therewith by passing a current through such a coil. The current may be a direct current ("DC") flowing through the coil in a direction so as to generate a magnetic polarity associated with electromagnet 91 that is opposite that of the magnetic polarity of permanent magnet 87. It will be understood that the polarity of permanent magnet 87 may be known a priory and/or may be detected via a road sensor and/or via the identity of the vehicle as such identity is relayed to a road sensor. Thus, electromagnet 91 (which may be rigidly attached to the road) attracts permanent magnet 87 (which may be rigidly attached to the vehicle), as is illustrated by attraction vector 93 in FIG. 6(a). Thus, the vehicle may be pulled in the direction of its motion and, as a consequence, kinetic energy may be transferred/added to the vehicle yielding an increase in speed/acceleration of the vehicle, if desired, in its direction of motion. It will be understood that wireless communications link 92 may convey to road sensor 90 a need of the vehicle (e.g., a need of a driver of the vehicle) to increase speed/acceleration, to maintain speed/acceleration substantially invariant or to reduce speed/acceleration. Such information may be relayed, for example, to device 85 of said at least one other device 85, 86, 89 (or to some other device other than a device of said at least one other device 85, 86, 89) via a connection (not shown) of device 85 to one or more other component(s) (sensor(s) and/or system(s)) of the vehicle. It will be understood that, according to some embodiments, each device/component of the vehicle (e.g., sensor, magnet, etc.) may be connected (wirelessly and/or otherwise) to at least one other device/component of the vehicle and/or to at least one other device/component of the road.

In some embodiments, responsive to a need to increase speed/acceleration of the vehicle, a command and/or instruction may be transmitted via, for example, link 92 (and/or any other link) to road sensor 90 (and/or any other road sensor and/or road component), and then, via a connection (not shown) between road sensor 90 (and/or said any other road sensor and/or road component) and electromagnet 91 and/or any other component (or system) associated with the road, a magnetic measure (e.g., magnetic intensity) associated with electromagnet 91 may be increased (maximally or otherwise) by, for example, varying a current (e.g., a DC) associated with a coil of the electromagnet. Further, responsive to a need to maintain speed/acceleration of the vehicle substantially invariant, said command and/or instruction, that may be transmitted as described above, may require that said magnetic measure be reduced (maximally to substantially zero or, otherwise, to a small level) by, for example, reducing (to substantially zero or other small level) said current associated with the coil of the electromagnet. Further, responsive to a need to decrease speed/acceleration of the vehicle, said command and/or instruction, that may be transmitted as described above, may require that said magnetic measure be changed in a polarity thereof by, for example, changing a direction of the current associated with the coil of the electromagnet. In such a case, the attraction vector 93 (see FIG. 6(a) and FIG. 6(b)) changes direction and becomes a repulsion vector.

FIGS. 6(a) 6(b) and 6(c), illustrate the vehicle moving on the road in a direction from right to left, as is indicated by the "direction of motion of vehicle" arrow. It will be understood that wireless communications link 92 may be configured to transmit and receive in accordance with a time division duplex protocol whereby a transmission occurs at a frequency over a first interval of time while a reception occurs at the frequency and over a second interval of time that is substantially non-overlapping (or non-overlapping at all) with the first interval of time. Other protocols are also possible including direct sequence spread-spreading, frequency hopping or any combination thereof. According to some embodiments, at least one of devices 85, 86, 89 may be configured to transmit at a rate of 10 times per second or higher. It will be understood that the vehicle may also comprise at least one coil, including at least one plurality of windings comprising a metallic conductive filament, which when passed through a magnetic field of the electromagnet 91 and/or any other magnet that may be integrated with the road, may be configured to generate an electrical current that may be used to charge a battery of the vehicle. Accordingly, in some embodiments, a kinetic energy that is wirelessly transferred to the vehicle as described above (i.e., a kinetic energy gain by the vehicle) may be used to counteract/oppose a kinetic energy depletion that the vehicle may be subjected to as a consequence of the electrical current and the resulting magnetic field associated therewith that is generated by said at least one plurality of windings.

Figure 7:
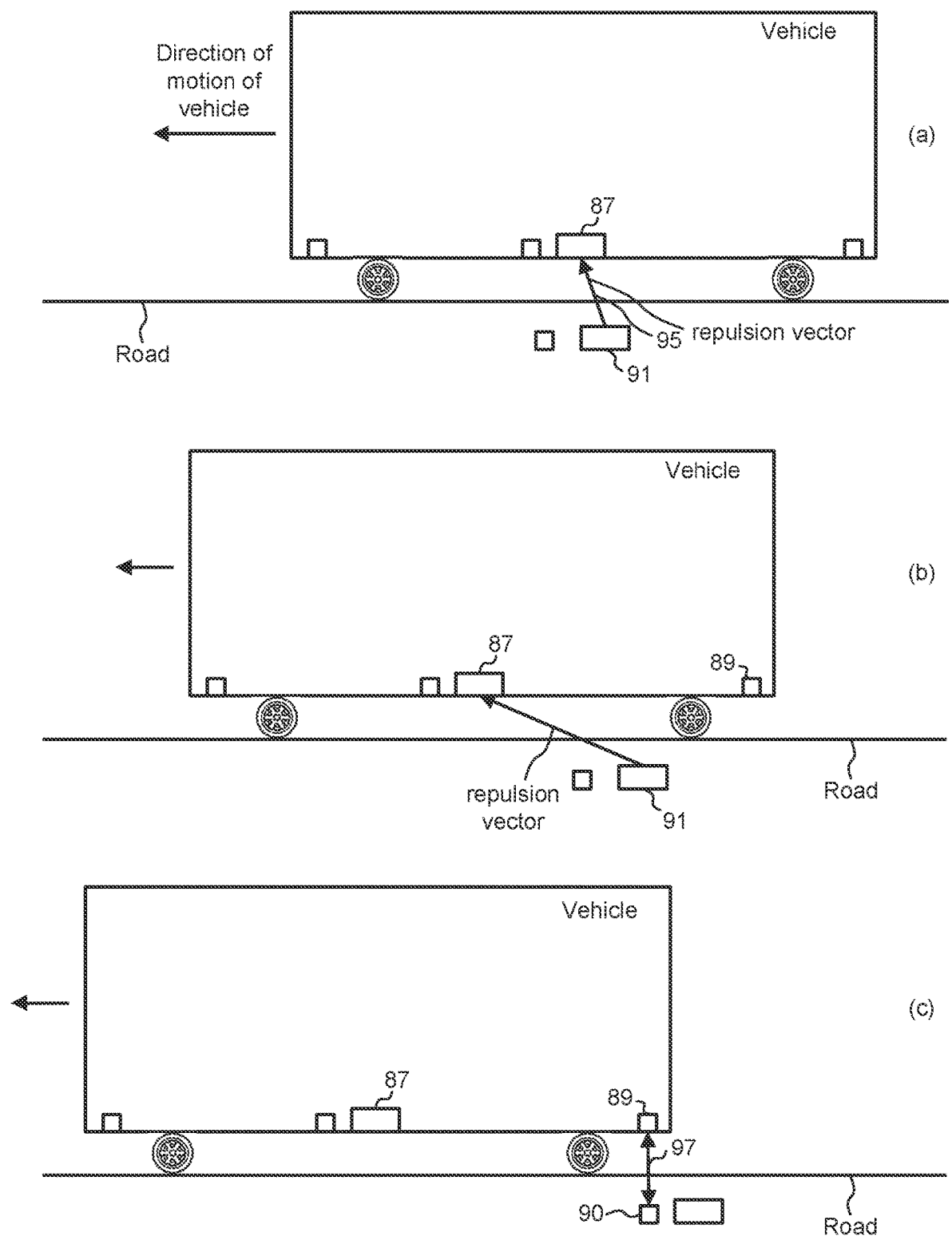
FIG. 7 is illustrative of further systems/methods of providing energy to a vehicle according to additional embodiments of the invention.

FIG. 7 is analogous to FIG. 6 and illustrates the vehicle being "pushed" by the road magnet 91 (via repulsion vector 95 between the road magnet 91 and the vehicle magnet 87), responsive to the vehicle having advanced its position relative to the vehicle position that is illustrated in FIG. 6(c) as may be communicated between the vehicle and the road, as is illustrated in FIG. 6(c) via link 94 and/or any other link.

According to additional inventive concepts and embodiments that will now be described, a smartphone (or any other device) may be configured to access a blockchain (and/or any other file, other than the blockchain) that may include data associated with an entity. The term "entity" as used herein may comprise a person, a machine (that may include an Artificial Intelligence ("AI") capability), a business, a document (such as, for example, a contract, an agreement, a business plan, a technical paper, a medical record, a last will and testament, etc.), a financial transaction, a physical structure (man-made or natural), an idea, an unencrypted or encrypted data file and/or anything else that may be associated with information that has been stored (or is to be stored) in the blockchain and/or outside of the blockchain. The term AI as used herein comprises a machine or a component thereof that is configured to perform a task, step or function responsive to an input that may be provided to the AI by a human, an environment, a hybrid entity (comprising a human component and a non-human component) and/or a non-human.

According to some embodiments, the smartphone comprises a conventional configuration and/or a wearable configuration, whereby the smartphone fits in a pocket of a person and is thus carried by the person and/or is attached to a body part of the person (as is, for example, illustrated in FIG. 5) and is thus carried by the person. Independently of any smartphone configuration, the smartphone may comprise an encryption algorithm, that may be responsive to inputs such as, for example, a key input and/or other input(s), that may be unique to the smartphone, whereby data associated with said entity may be encrypted and then stored in one or more blockchain(s) and/or outside of the one or more blockchain(s). The encryption algorithm may, according to some embodiments, comprise a private encryption algorithm that is configured to encrypt data responsive to a key input and/or a time-of-day ("TOD") input. Accordingly, the private encryption algorithm that is responsive to said key input and/or TOD will (likely) differ from any other private encryption algorithm associated with any other smartphone simply because the time associated with encryption (i.e., the TOD input) by a first smartphone and that associated with a second smartphone will (likely) be different. Of course, a key used by the first smartphone will also (likely) differ from a key used by the second smartphone. The key may, according to some embodiments, comprise a user-specified key. According to other embodiments, the key may comprise a system-generated and/or a smartphone-generated key; wherein according to some embodiments, said system comprises one or more base station(s), various other infrastructure associated with the one or more base station(s) (as those skilled in the art can appreciate) and a wireless connection to the smartphone.

Whatever the case may be regarding the origin/source of the key, the key may be used by the smartphone to conduct encryption of data (that may be associated with the entity) and then, the smartphone and/or the system may, according to embodiments of the invention, store the key that has been used to perform encryption, to be accessed and used again, as needed, to perform an inverse function of encryption (i.e., decryption) upon accessing said data from storage in said one or more blockchain(s) and/or from storage outside of said one or more blockchain(s). Similarly, as with using and storing of the key, the TOD used for encryption (and/or any other parameter used for encryption that may be needed to perform decryption) may also be stored by the system and/or by the smartphone in order to be accessed and used again, as necessary, to decrypt data stored in said one or more blockchain(s) and/or data stored outside of the one or more blockchain(s). According to some embodiments, the smartphone comprises a wallet, such as wallet 1461, as is illustrated in FIG. 3, and the key and/or TOD used for encryption (and/or any other parameter used for encryption that may also be needed to perform decryption) may be stored in said wallet and/or outside of said wallet in, for example, a memory, such as in memory 1453 that is illustrated in FIG. 3.

According to some embodiments, first data (comprising specific information) may preferentially and/or selectively be accessed from a storage location that is outside of said one or more blockchain(s). Said first data may then be decrypted (if need be) and examined for authenticity. If the first data is determined to have been corrupted (via, for example, unauthorized alteration, deletion and/or addition thereto) then that first data, that has been accessed from the storage location that is outside of said one or more blockchain(s), may be discarded and second data comprising said specific information may be accessed from said one or more blockchain(s) and used accordingly. It will be understood that data that has been discarded (such as said first data that has been determined to have been corrupted) may be restored by the second data that is accessed from the one or more blockchain(s).

According to some embodiments, said storage location that is outside of said one or more blockchain(s) comprises a storage location in one or more air tag(s); wherein, as used herein the term "air tag" refers to a device comprising at least some functionality as is the case with, for example, the Apple AirTag. Accordingly, an air tag may be configured to selectively decrypt data that is relevant to and/or is being requested by an authorized reader and relay the data that is relevant to and/or is being requested by the authorized reader (decrypted and/or encrypted) to the authorized reader. Responsive to the classification of the authorized reader, (e.g., police, bank, government agency, airport security, etc.) the air tag may selectively provide information. Only relevant information may be provided; i.e., only what's relevant to the authorized reader in accordance with its classification. Accordingly, a "permission" associated with the authorized reader may be communicated to a "keeper device" in which information has been stored and, in response, the authorized reader may be enabled, and/or given access, to selectively to extract information that may be stored in said keeper device; wherein said selectively to extract information comprises extracting some information but not all information that is kept by said keeper device (unless the permission is of a "global" and/or unrestricted category). It is understood that said keeper device may be any device such as, for example, any of the devices discussed herein (smartphone, wallet of smartphone, memory of smartphone and/or any other component thereof, smartwatch and/or any component thereof, a stand-alone chip that may be NFC capable, etc.).

According to some embodiments, a person (with aid from AI or not) may create a secure digital profile, that may be a substantially comprehensive secure digital profile, thus replacing a need of the person to maintain and use numerous documents such as, for example, a driver's license, a government-issued ID, one or more credit cards and/or other data that may comprise a personal and/or sensitive component (addresses of where the person currently lives and/or has lived in the past, work positions and/or titles that the person currently holds or held in the past, members of the person's immediate family, extended family and/or addresses, phone numbers and/or other coordinates associated therewith, etc.). The comprehensive secure digital profile may be encrypted and/or stored in one or more blockchain(s). Accordingly, the person may be equipped, with a Blockchain-Based Digital Identification File ("BBDIF") thus substantially ensuring immutability, decentralization and a tamper-resistant ledger thus substantially reducing a risk of unauthorized changes to personal data. The BBDIF may also be stored outside of the blockchain, for example, in the person's smartphone and/or within a chip that may be attached to the person and/or positioned, according to some embodiments, under the person's skin, for example, on/in the person's arm and/or on/in any other body part of the person. According to some embodiments, said chip may comprise sensing one or more biometric parameter(s) of the person (such as, for example, a blood content of one or more substances) and may further comprise a Near Field Communications ("NFC") functionality whereby said chip may wirelessly provide data to an authorized reader when brought in proximity to the authorized reader (similar to a contactless credit card that is configured to provide data when brought in proximity to a Point of Sale ("POS") machine). The chip may be configured to wirelessly communicate, as necessary, with the smartphone using NFC and/or a Bluetooth technology.

The chip (and/or any other device that is in possession of data, such as, for example, the smartphone and/or the wallet/memory thereof) may be configured to selectively decrypt data that is relevant to and/or is being requested by the authorized reader and relay the data that is relevant to and/or is being requested by the authorized reader (decrypted and/or encrypted) to the authorized reader. Accordingly, depending on the classification of the authorized reader, (e.g., police, bank, government agency, airport security, etc.) the chip, and/or said any other device that is in possession of data, such as, for example, the smartphone and/or the wallet/memory thereof, may selectively provide information. According to some embodiments, only relevant information of, for example, the BBDIF and/or of any other file that may be on the chip and/or on any other device that is in possession of data, such as, for example, the smartphone and/or the wallet/memory thereof may be provided; i.e., only what's relevant to the authorized reader in accordance with its classification. Stated differently, in accordance with embodiments disclosed herein, a person may gain control over what data is revealed and under what circumstances, thus enhancing privacy and security. For example, when paying for something, one may select to reveal only relevant credit card information and nothing else.

According to some embodiments, one's personal, financial, social and consumer data may be encrypted and be encapsulated in a smart contract. According to some embodiments, said smart contract may be configured to be executed automatically responsive to one or more predetermined conditions having occurred, occurring and/or planned to occur over a predetermined interval of time. The smart contract may be stored in one or more blockchain(s) and/or outside of the one or more blockchain(s) thus providing flexibility and accommodating different use cases.

Embodiments as described herein, in whole or in part, may be used to replace traditional forms of identification, such as, for example, driver's licenses, passports, birth certificates, etc., streamlining various verification processes. Financial transactions, property ownership transfers and/or other legal processes may be automated via smart contracts thus reducing paperwork, bureaucracy, red tape and/or human error/racism/profiling, just to name some. It will be understood that said chip, as described herein, may be integrated with a smartwatch, smartphone and/or any other device, and that a blockchain may reside therein (i.e., within said chip, smartwatch, smartphone and/or any other device), and may be enabled, according to some embodiments, by one or more supercomputer technologies that may comprise elements of quantum computing. Accordingly, a person may possess a private blockchain, comprising data and/or events exclusively specific to that person, not necessarily to the exclusion of any other conventional blockchain that may also comprise data and/or events associated with the person. It will also be understood that instead of encryption and/or decryption being performed by using a private key and/or a TOD value as described above, the encryption and/or decryption may, according to some embodiments, be performed using a key other than said private key, that may comprise a public key according to some embodiments (not necessarily to the exclusion of any other key including the private key). It will also be understood that, according to some embodiments, the TOD value may comprise a Time of Week ("TOW") value, a Time of Month ("TOM") value and/or a Time of Year ("TOY") value. According to other embodiments, the encryption and/or decryption may not be based on any such time dependent key.

Many different embodiments, besides those described herein, are possible in connection with the description, drawing(s), flowchart(s) and/or claims that are presented herein, as will be appreciated by those skilled in the art. It would be unduly repetitious and obfuscating to describe and/or illustrate every combination and sub-combination of these embodiments. Accordingly, the present specification, including the drawing(s), flowchart(s) and claims shall be construed to constitute a complete written description of all combinations and sub-combinations of embodiments and of the manner and process of making and using them, and shall support claims to any such combination and/or sub-combination.

It will be understood that any of the embodiments described herein (or any element and/or portion of any embodiment described herein) may be combined with any other embodiment (or element/portion thereof) to provide yet another embodiment. The number of different embodiments that are provided by the present inventive concepts are too numerous to list and describe individually and in whole. Those skilled in the art will appreciate that any of the embodiments described herein (or any element/portion of any embodiment that is described herein) may be combined with any other embodiment (or element/portion thereof) to provide yet another embodiment.

Accordingly, a method/system may be provided comprising steps/functions of: associating a first device with a person; storing information in the first device; and responsive to an authority associated with a second device, and responsive to receiving a request at the first device from the second device, selectively accessing a specific component of the information that is stored in the first device, comprising only a subset of the information that is stored in the first device, via the second device and a wireless link that is established between the first device and the second device.

According to some embodiments, said associating a first device with a person comprises attaching the first device to the person.

According to other embodiments, said attaching the first device to the person comprises positioning the first device under the skin of the person.

According to further embodiments, said storing information in the first device comprises storing information in the first device by using a smartphone, smartwatch and/or another device and establishing a wireless link between said first device and said smartphone, smartwatch and/or another device.

According to additional embodiments, said wireless link comprises licensed frequencies and/or unlicensed frequencies.

According to yet other embodiments, said licensed frequencies and/or unlicensed frequencies comprises frequencies used for cellular communications, frequencies used for Wi-Fi communications, frequencies used for NFC and/or frequencies used for Bluetooth-based communications.

Still further, according to some embodiments, said storing information in the first device comprises storing information in the first device by using an authorized device and a wireless link between the authorized device and the first device; wherein said wireless link comprises licensed frequencies and/or unlicensed frequencies; and wherein said licensed frequencies and/or unlicensed frequencies comprises frequencies used for cellular communications, frequencies used for Wi-Fi communications, frequencies used for NFC and/or frequencies used for Bluetooth-based communications.

According to yet other embodiments, said selectively accessing a specific component of the information that is stored in the first device, comprising only a subset of the information that is stored in the first device, comprises selectively accessing the specific component of the information that is stored in the first device, comprising only the subset of the information that is stored in the first device, responsive to a predetermined need to know associated with the authority of the second device; wherein said wireless link that is established between the first device and the second device comprises licensed frequencies and/or unlicensed frequencies; and wherein said licensed frequencies and/or unlicensed frequencies comprises frequencies used for cellular communications, frequencies used for Wi-Fi communications, frequencies used for NFC and/or frequencies used for Bluetooth-based communications.

According to yet more embodiments, said first device comprises a smartphone, a wallet of the smartphone, a memory of the smartphone, a smartwatch and/or any other device, a wallet of the smartwatch and/or said any other device, a memory of the smartwatch and/or said any other device and/or a chip that is associated with the person.

According to yet further embodiments, said first device comprises a blockchain and wherein said storing information in the first device comprises storing information in the blockchain.

According to some embodiments, prior to said storing information, the method/system further comprises the step/function of encrypting the information; wherein said encrypting comprises using a private key and/or a TOD value to perform said encrypting; and wherein the method/system further comprises the step/function of storing said key and/or TOD value to be used in performing decrypting.

According to additional embodiments, said storing information in the first device by using an authorized device and a wireless link between the authorized device and the first device comprises: receiving data at the first device from the authorized device; encrypting said data that is received using a key and/or a TOD value; and then storing the encrypted data; wherein said authorized device comprises a smartphone, a smartwatch and/or a device associated with a city, state and/or other government authority; and wherein said storing the encrypted data comprises storing the encrypted data in a blockchain.

The present inventive concepts have been described/specified with reference to figure(s), block diagram(s), Claim(s) and/or flowchart illustration(s) of methods, apparatus (systems) and/or computer program products according to various embodiments. It is understood that a block of the block diagram(s) and/or flowchart illustration(s), and combinations of blocks in the block diagram(s) and/or flowchart illustration(s), may be implemented by computer program instructions. These computer program instructions may be provided to a processor of a general-purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the figure(s), block diagram(s) and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the figure(s), block diagram(s) and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the figure(s), block diagram(s) and/or flowchart block or blocks.

The claims attached herein form part of the present disclosure/specification and provide/describe further embodiments associated with inventive concepts disclosed herein. It will be understood that any of the embodiments described herein (or any element/portion of any embodiment described herein) may be combined with any other embodiment (or element/portion thereof) to provide yet another embodiment.

At least some of the present inventive concepts (e.g., purchase, installation and/or placement of the digital asset in a device; purchase of an insurance policy associated therewith, communications between the DA and an owner of the DA, communications between the DA and the business having sold/insured the DA and/or any other process described herein) may be embodied in hardware and/or in software (including firmware, resident software, microcode, etc.). According to some embodiments, at least some of the present inventive concepts may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

It should also be noted that in some alternate implementations, the functions/acts noted in the blocks of the block diagram(s)/flowchart(s) and/or figure(s) may occur out of the order noted in the block diagram(s)/flowchart(s) and/or figure(s). For example, two blocks shown in succession may in fact be executed substantially concurrently or the blocks may sometimes be executed in the reverse order, depending upon the functionality/acts involved. Moreover, the functionality of a given block of the flowchart(s)/block diagram(s) and/or figure(s) may be separated into multiple blocks and/or the functionality of two or more blocks of the flowchart(s)/block diagram(s) and/or figure(s) may be at least partially integrated with one another.

Many different embodiments, besides those described herein, are possible in connection with the above description, drawing(s), flowchart(s) and claims that are presented herein, as will be appreciated by those skilled in the art. It would be unduly repetitious and obfuscating to describe/illustrate every combination and sub-combination of these embodiments. Accordingly, the present specification, including the drawing(s), flowchart(s) and claims shall be construed to constitute a complete written description of all combinations and sub-combinations of embodiments and of the manner and process of making and using them, and shall support claims to any such combination and/or sub-combination.

It will be understood that any of the embodiments described herein (or any element/portion of any embodiment described herein) may be combined with any other embodiment (or element/portion thereof) to provide yet another embodiment. The number of different embodiments that are provided by the present inventive concepts are too numerous to list and describe individually and in whole. Those skilled in the art will appreciate that any of the embodiments described herein (or any element/portion of any embodiment that is described herein) may be combined with any other embodiment (or element/portion thereof) to provide yet another embodiment.

The term "therebetween" as used herein means "with one another." For example, the sentence "it is expected that wireless devices will continue to proliferate with increasing connectivity therebetween" means "it is expected that wireless devices will continue to proliferate with increasing connectivity with one another."

It will be understood that when an element is referred to as being "connected", "coupled" and/or attached to another element, it can be directly connected, coupled and/or attached to the other element or intervening elements may be present. Furthermore, "connected", "coupled" and/or attached as used herein includes wirelessly connected, coupled and/or attached directly therebetween and/or via one or more intervening entities, devices and/or systems.

The terminology used herein is for the purpose of describing particular embodiments only and is not intended to be limiting of the inventive concepts. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although terms such as "first" and "second" may be used herein to describe various elements/methods, these elements/methods should not be limited by these terms. These terms are only used to distinguish one element/method from another element/method. Thus, a first element/method could be termed a second element/method, and a second element/method may be termed a first element/method without departing from the teachings of the present inventive concepts, as will be appreciated by those skilled in the art.

As used herein, the term "and/or" includes any and all combinations of one or more of the associated listed items. The symbol "/" may also be used as a shorthand notation for "and/or".

As used herein, the term "electronic device", "transmitter", "receiver" and/or "transceiver" include(s) transmitters/receivers of cellular, Wi-Fi, Bluetooth and/or any other transmitter/receiver (including a near field communications ("NFC") transmitter and/or receiver or an internet-of-things ("IoT") transmitter/receiver) with or without a multi-line display; smartphones and/or Personal Communications System (PCS) terminals that may include data processing, facsimile and/or data communications capabilities; Personal Digital Assistants (PDA) that can include a radio frequency transceiver and/or a pager, Internet/Intranet access, Web browser, organizer, calendar and/or a Global Positioning System (GPS) receiver; and/or conventional laptop and/or palmtop computers or other appliances, which include a radio frequency transmitter and/or receiver. As used herein, the term "electronic device", "transmitter", "receiver" and/or "transceiver" also include(s) any other radiator and/or receptor of electromagnetic energy, man-made and/or naturally occurring, that may have time-varying and/or fixed geographic coordinates and/or may be portable, transportable, installed in a vehicle (aeronautical, maritime, or land-based) and/or situated/configured to operate locally and/or in a distributed fashion on earth, in vehicles (land-mobile, maritime and/or aeronautical) and/or in space. A "electronic device", "transmitter", "receiver" and/or "transceiver" may also may be referred to herein as a "base station," "access point," "device," "mobile device," "wireless device," "radiating device," "receiving device," "terminal," "radioterminal," "smartphone" and/or simply as a "phone".

It will be understood that the term "substantially", as may be used herein, means "to a great/large extent, if not entirely or totally". For example, "substantially overlaps" means that a first entity such as, for example, a first set/interval and a second entity such as a second set/interval (that are being compared with one another) overlap therebetween, but there may be a portion thereof such as, for example, at a beginning, an end and/or elsewhere that may not comprise an overlap. For example, if a first event occurs over a first interval of time, for example, from 6 AM to 10 AM, and a second event occurs over a second interval of time, for example, from 7 AM to 11 AM, then it may be said that the second event substantially overlaps in time with the first event and/or that the first event substantially overlaps in time with the second event. It may also be said that the first and second events are "substantially congruent/concurrent in time".

Further, the term "substantially differ" as may be used herein means that two or more sets (such as, for example, two or more sets of frequencies) that are being referenced or compared therebetween comprise mutually exclusive elements therebetween (such as, for example, comprising mutually exclusive frequencies therebetween) but may also comprise some elements (e.g., some frequencies) that are common therebetween. For example, a first set of frequencies comprising frequencies from, for example, 1 GHz to 3.1

GHz and a second set of frequencies comprising frequencies, for example, from 3 GHz to 5 GHz substantially differ therebetween.

In the drawings, flowcharts and description, there have been disclosed embodiments of the invention and, although specific terms are employed, they are used in a generic and descriptive sense only and not for purposes of limitation, at least some scope of the invention being set forth by the following claims.

What is claimed:

1. A method of wirelessly providing information to a second device by a first device, the method comprising:
    storing information that is associated with a person in the first device; and
    responsive to an authority associated with the second device, and responsive to wirelessly receiving a request at the first device from the second device, selectively providing to the second device, via a wireless link that is established between the first device and the second device, only a subset of the information that is stored, is relevant to said authority associated with the second device and is further relevant to the request received at the first device from the second device;
    wherein the first device comprises an element thereof that is positioned under the skin of the person; and
    wherein the element that is positioned under the skin of the person is configured to provide to the second device, using a Near Field Communications technology, only said subset of the information that is stored responsive to being activated by an electromagnetic field.

2. The method of claim 1, wherein said storing information that is associated with a person in the first device comprises storing information in the first device by using a smartphone, smartwatch and/or another device and establishing a wireless link between said first device and said smartphone, smartwatch and/or another device.

3. The method of claim 2, wherein said wireless link comprises licensed frequencies and/or unlicensed frequencies.

4. The method of claim 3, wherein said licensed frequencies and/or unlicensed frequencies comprises frequencies used for cellular communications, frequencies used for Wi-Fi communications, frequencies used for Near Field Communications and/or frequencies used for Bluetooth-based communications.

5. The method of claim 1, wherein said storing information that is associated with a person in the first device comprises storing information in the first device by using an authorized device and a wireless link between the authorized device and the first device.

6. The method of claim 5, wherein said wireless link comprises licensed frequencies and/or unlicensed frequencies.

7. The method of claim 6, wherein said licensed frequencies and/or unlicensed frequencies comprises frequencies used for cellular communications, frequencies used for Wi-Fi communications, frequencies used for Near Field Communications and/or frequencies used for Bluetooth-based communications.

8. The method of claim 1, wherein said selectively providing to the second device comprises selectively accessing a specific component of the information that is stored in the first device, comprising only the subset of the information that is stored in the first device, responsive to a predetermined need to know associated with the authority of the second device.

9. The method of claim 8, wherein said wireless link that is established between the first device and the second device comprises licensed frequencies and/or unlicensed frequencies.

10. The method of claim 9, wherein said licensed frequencies and/or unlicensed frequencies comprises frequencies used for cellular communications, frequencies used for Wi-Fi communications, frequencies used for Near Field Communications and/or frequencies used for Bluetooth-based communications.

11. The method of claim 1, wherein said first device comprises a smartphone, a wallet of the smartphone, a memory of the smartphone, a smartwatch and/or any other device, a wallet of the smartwatch and/or said any other device, a memory of the smartwatch and/or said any other device and/or a chip that is associated with the person.

12. The method of claim 1, wherein said first device comprises a blockchain and wherein said storing information in the first device comprises storing information in the blockchain.

13. The method of claim 1, further comprising:
    prior to said storing information, encrypting the information.

14. The method of claim 13, wherein said encrypting comprises using a private key and/or a TOD value to perform said encrypting.

15. The method of claim 14, further comprising:
    storing said key and/or TOD value to be used in performing decrypting.

16. The method of claim 5, wherein said storing information in the first device by using an authorized device and a wireless link between the authorized device and the first device comprises:
    receiving data at the first device from the authorized device;
    encrypting said data that is received using a key and/or a TOD value; and then
    storing the encrypted data.

17. The method of claim 16, wherein said authorized device comprises a smartphone, a smartwatch and/or a device associated with a city, state and/or other government authority; and wherein said storing the encrypted data comprises storing the encrypted data in a blockchain.

18. A system comprising a first device that is configured to perform operations comprising:
    storing information that is associated with a person in the first device; and
    responsive to an authority associated with a second device, and responsive to wirelessly receiving a request at the first device from the second device, selectively providing to the second device, via a wireless link that is established between the first device and the second device, only a subset of the information that is stored, is relevant to said authority associated with the second device and is further relevant to the request received at the first device from the second device;
    wherein the first device comprises an element thereof that is positioned under the skin of the person; and
    wherein the element that is positioned under the skin of the person is configured to provide to the second device, using a Near Field Communications technology, only said subset of the information that is stored responsive to being activated by an electromagnetic field.

19. The system of claim 18, wherein said storing information that is associated with a person in the first device comprises storing information in the first device by using a smartphone, smartwatch and/or another device and establishing a wireless link between said first device and said smartphone, smartwatch and/or another device.

20. The system of claim 19, wherein said wireless link comprises licensed frequencies and/or unlicensed frequencies.

21. The system of claim 20, wherein said licensed frequencies and/or unlicensed frequencies comprises frequencies used for cellular communications, frequencies used for Wi-Fi communications, frequencies used for Near Field Communications and/or frequencies used for Bluetooth-based communications.

22. The system of claim 18, wherein said storing information that is associated with a person in the first device comprises storing information in the first device by using an authorized device and a wireless link between the authorized device and the first device.

23. The system of claim 22, wherein said wireless link comprises licensed frequencies and/or unlicensed frequencies.

24. The system of claim 23, wherein said licensed frequencies and/or unlicensed frequencies comprises frequencies used for cellular communications, frequencies used for Wi-Fi communications, frequencies used for Near Field Communications and/or frequencies used for Bluetooth-based communications.

25. The system of claim 18, wherein said selectively providing to the second device comprises selectively accessing a specific component of the information that is stored in the first device, comprising only the subset of the information that is stored in the first device, responsive to a predetermined need to know associated with the authority of the second device.

26. The system of claim 25, wherein said wireless link that is established between the first device and the second device comprises licensed frequencies and/or unlicensed frequencies.

27. The system of claim 26, wherein said licensed frequencies and/or unlicensed frequencies comprises frequencies used for cellular communications, frequencies used for Wi-Fi communications, frequencies used for Near Field Communications and/or frequencies used for Bluetooth-based communications.

28. The system of claim 18, wherein said first device comprises a smartphone, a wallet of the smartphone, a memory of the smartphone, a smartwatch and/or any other device, a wallet of the smartwatch and/or said any other device, a memory of the smartwatch and/or said any other device and/or a chip that is associated with the person.

29. The system of claim 18, wherein said first device comprises a blockchain and wherein said storing information in the first device comprises storing information in the blockchain.

30. The system of claim 18, further comprising:
prior to said storing information, encrypting the information.

31. The system of claim 30, wherein said encrypting comprises using a private key and/or a TOD value to perform said encrypting.

32. The system of claim 31, further comprising:
storing said private key and/or TOD value to be used in performing decrypting.

33. The system of claim 22, wherein said storing information in the first device by using an authorized device and a wireless link between the authorized device and the first device comprises:
receiving data at the first device from the authorized device;
encrypting said data that is received using a key and/or a TOD value; and then
storing the encrypted data.

34. The system of claim 33, wherein said authorized device comprises a smartphone, a smartwatch and/or a device associated with a city, state and/or other government authority; and wherein said storing the encrypted data comprises storing the encrypted data in a blockchain.

35. The system of claim 34, wherein said key comprises a private key.

* * * * *